United States Patent
Loy

Patent Number: 5,906,774
Date of Patent: May 25, 1999

[54] SUBMERGED DIFFUSER LIFTING ARRANGEMENT

[75] Inventor: Daniel E. Loy, Boca Raton, Fla.

[73] Assignee: Parkson Corporation, Ft. Lauderdale, Fla.

[21] Appl. No.: 08/859,637

[22] Filed: May 20, 1997

[51] Int. Cl.⁶ ........................................................ B01F 3/04
[52] U.S. Cl. ........................ 261/120; 261/121.1; 261/124; 210/220
[58] Field of Search ................... 210/220, 242.1, 210/242.2; 261/120, 77, 121.1, 122.1, 124, DIG. 47, DIG. 70

[56] References Cited

U.S. PATENT DOCUMENTS

| | | | |
|---|---|---|---|
| 4,235,720 | 11/1980 | Nakajima et al. | 210/242.2 |
| 4,287,062 | 9/1981 | von Nordenskjöld . | |
| 4,797,212 | 1/1989 | von Nordenskjöld . | |
| 5,089,179 | 2/1992 | von Nordenskjöld . | |
| 5,133,876 | 7/1992 | Tharp . | |
| 5,192,467 | 3/1993 | Strunc et al. . | |
| 5,316,671 | 5/1994 | Murphy . | |

FOREIGN PATENT DOCUMENTS

WO 88/07977 10/1988 Italy ..................................... 210/242.2

Primary Examiner—Jay H. Woo
Assistant Examiner—Robert Hopkins
Attorney, Agent, or Firm—Baker & Botts, L.L.P.

[57] ABSTRACT

In the submerged diffuser arrangement described in the specification, a plurality of submerged air diffuser arrangements are disposed adjacent to the bottom of in a body of wastewater to be aerated and connected an air supply pipe extending along the surface of the wastewater. Air is supplied from the air supply pipe through downcomers leading to the diffuser arrangements. The diffusers may be suspended from the air pipe above the bottom or they may rest on the bottom. In order to raise the diffuser arrangements to the surface of the wastewater for servicing, inflatable buoyant members are affixed to each diffuser arrangement or to the lower ends of the associated downcomers. The inflatable buoyant members are connected through tubing to valves from which air may be supplied under pressure, either from the air supply pipe or form a portable air compressor or a compressed air container or through an air pressure line leading from a remote air supply located on the shore of the basin.

10 Claims, 1 Drawing Sheet

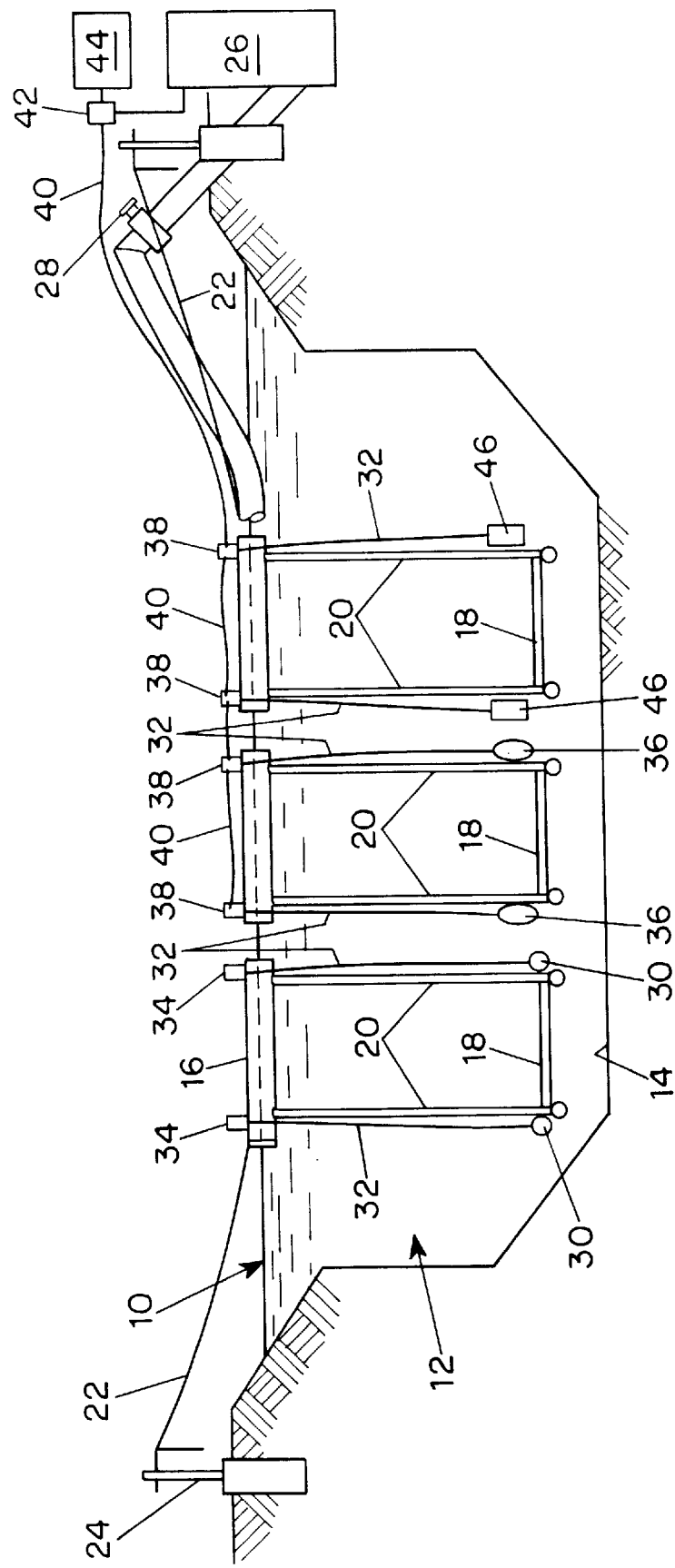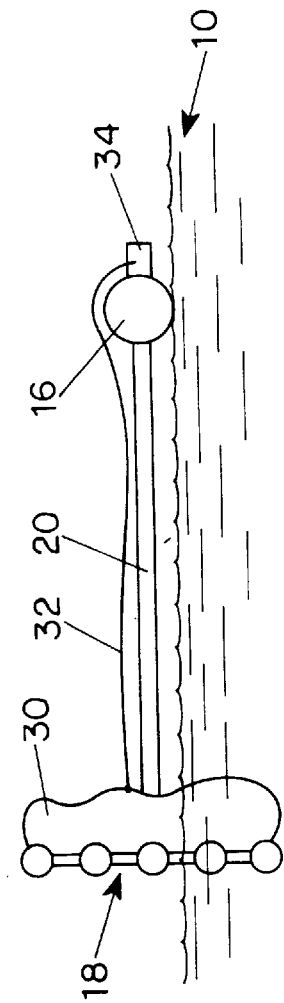

SUBMERGED DIFFUSER LIFTING ARRANGEMENT

BACKGROUND OF THE INVENTION

This invention relates to aeration systems for diffusing air into liquids utilizing submerged diffusers and, more particularly, to an aeration system in which access to the submerged diffusers is facilitated.

In many aeration systems for treatment of wastewater such as described, for example, in the Von Nordenskjöld et al. Patents Nos. 4,287,062, 4,797,272 and 5,472,611, the disclosures of which are incorporated herein by reference, purification of wastewater in a basin is effected by aerating the water with air bubbles emitted by submerged diffusers located adjacent to the bottom of the basin. In those systems the diffusers are suspended by downcomers from flexible floating air lines which supply air under pressure to the diffusers. As air bubbles emerge from the diffusers, the resulting turbulence causes the diffusers to move back and forth in the basin which in turn causes the flexible aeration lines to move along the surface of the water so that the entire aeration region of the basin is swept by the diffusers. In other submerged diffuser aeration systems, the diffusers normally rest on the bottom of the basin.

Periodically, it is necessary to obtain access to such submerged diffusers at the bottom of the basin for servicing. This might be accomplished with considerable difficulty by manually grasping downcomers by which the diffusers are suspended from a floating air line and attempting to pull the diffusers up to the surface of the water by moving the downcomers to a horizontal orientation or by grappling for submerged diffusers resting on the bottom of the basin. When the diffusers have been raised they must be held at the surface of the water while the necessary servicing is effected and, if inadvertently released, the same procedure must be followed to raise them again from their submerged position at the bottom of the basin.

The Tharp Patent No. 5,133,876 proposes a solution to this problem by providing a flexible retrieval rope tied at its lower end to the diffuser and secured at the surface by tying it to the aeration line or to a float which floats on top of the wastewater. Such retrieval lines, however, still require manual effort and are subject to loss or damage from debris in the wastewater or deterioration with time.

The Murphy Patent No. 5,316,671 discloses aeration diffuser trains consisting of bladders supporting flexible air lines having suspended diffusers. The bladders are inflated to hold the air line at the surface of the water and suspend the diffusers above the bottom during operation but, to avoid damage to aeration lines and their suspended diffusers resulting from floating debris in wastewater being treated when the diffusers are inoperative, the bladders may be deflated to pennit the air line to sink until it is below the surface of the water and the diffusers rest on the bottom of the basin. When the air line is intended for operation again, the bladders are reinflated, raising the air line to the surface of the water and suspending the diffusers away from the bottom of the basin. The submerged diffusers, however, must still be raised manually to the surface of the water in the manner described above for servicing.

SUMMARY OF THE INVENTION

Accordingly, it is an object of the present invention to provide an aeration system having submerged diffusers which overcomes the disadvantages of the prior art.

Another object of the invention is to provide an aeration system which facilities access to submerged air diffusers.

These and other objects of the invention are attained by providing an aeration line with a plurality of submerged air diffusers adjacent to the bottom of a basin and providing at least one inflatable buoyant member associated with each of the submerged air diffusers which, when inflated with air, provides sufficient buoyancy to raise the air diffuser to the surface of the water. The inflatable buoyant member may, for example, be a bladder or a canister with an opening in the bottom by which the volume of air in the canister may be increased in response to air supplied to the canister under pressure.

In one embodiment, the inflatable buoyant member is connected through a tube to a valve at the surface of the water through which compressed air may be supplied to inflatable buoyant member the air may be supplied from a portable compressor carried, for example, in a boat or from the aeration line supplying air to the diffusers. As an alternative, the inflatable buoyant member can be inflated through a valve at the surface from a compressed air container of the type used to inflate automobile tires. In another embodiment, a compressed air supply line extends along an air line at the surface of the wastewater which supplies air to the submerged diffusers and a valve at the surface connects the compressed air line to a tube leading to the associated inflatable buoyant member. In this case, the valve is effective in one position to enable filling of the inflatable buoyant member with compressed air from the compressed air line to raise the diffuser and in another position to empty the inflatable buoyant member when the diffuser is to be returned to the submerged position.

BRIEF DESCRIPTION OF THE DRAWING

Further objects and advantages of the invention will be apparent from a reading of the following description in conjunction with the accompanying drawings in which:

FIG. 1 is a schematic diagram illustrating an aeration system with a plurality of submerged air diffusers and associated inflatable buoyant members each arranged in a different manner in accordance with the invention;

FIG. 2 is a schematic side view illustrating one of the diffusers of FIG. 1 after being raised to the surface of the water by inflated inflatable buoyant members;

DESCRIPTION OF PREFERRED EMBODIMENTS

In the typical embodiment of the invention shown in FIG. 1, wastewater 10 in a basin 12 having a bottom surface 14 is aerated by one or more aeration lines consisting of a flexible aeration pipe 16 and a plurality of submerged aeration diffuser arrangements 18. In this embodiment, the diffuser arrangements 18 are suspended near the bottom surface 14 of the basin by downcomers 20 connecting the diffusers to the flexible pipe 16 and supplying the diffusers with air under pressure from the pipe 16 for diffusion into the wastewater 10. The flexible pipe 16 is tethered by a cable 22 anchored by supports 24 at opposite sides of the basin with sufficient slack to permit the pipe 16 and the suspended diffuser arrangements 18 to sweep back and forth across the basin to a predetermined extent as air is ejected from them. Air is supplied to the pipe 16 and the diffuser arrangements 18 from an air supply 26 connected to the pipe through a control valve 28.

Periodically, the diffuser arrangements 18 must be raised to the surface of the wastewater 10 in the basin for servicing or replacement. In order to avoid the necessity for grappling for a submerged diffuser and manually lifting it to the surface and physically holding it at the surface during servicing, each diffuser arrangement includes at least one inflatable buoyant member connected to an air pressure tube 32 which extends to the surface of the liquid in the basin. The inflatable buoyant members for the left diffuser arrangement 18 as seen in FIG. 1 are two bladders 30, located at opposite ends of the diffuser arrangement, which extend horizontally along the width of the diffuser arrangements.

In the illustrated embodiment, the air pressure tube 32 from each of the bladders 30 terminates in a valve 34 supported on the air line 16 through which compressed air may be supplied to the associated bladder 30 either from the pipe 16. Alternatively, air may be supplied to the air pressure tube from a portable compressed air supply such as a compressor in a boat or a compressed air container, in which case the valve 34 may be like an automobile tire valve. The inflated volume of both bladders 30 is sufficient to overcome the weight of the diffuser arrangement 18 and associated downcomers 20 and any attached ballast so that, when the bladders 30 are inflated, the diffuser arrangement will automatically rise to the surface of the liquid in the basin and assume a horizontal orientation with respect to the air pipe 16 as illustrated in FIG. 2. Preferably, each diffuser arrangement has two bladders mounted at opposite ends as illustrated in FIG. 1 to facilitate uniform support of the diffuser arrangement at the surface of the water. When servicing has been completed, the bladders 20 may be deflated by opening the valves 34, permitting the diffuser arrangement 18 to return to its submerged orientation. If desired, a single valve 34 may be connected to both of the inflatable buoyant members associated with each diffuser.

For the central diffuser arrangement shown in FIG. 1, an inflatable bladder 36 is affixed to the lower end of each of the downcomers 20 and each of the air pressure tubes 32 leading from the inflatable bladders 36 is connected to a valve 38 by which compressed air in a compressed air supply tube 40 extending along the flexible pipe 16 may be selectively introduced into the tubes 32 leading to the bladders 36. The compressed air supply tube 40 extends along the flexible pipe 16 to the shore of the basin 12 where it is connected through a valve 42 to the air supply 26 or, alternatively, to a separate pump 44 which is activated only when the diffusers 18 are to be serviced. When the pump 44 is turned on, the air pressure in the line 40 is maintained at a high level and, by selectively opening the valves 38 associated with individual diffuser arrangements 18, any one of the diffuser arrangements may be raised to the surface of the water as desired.

The valves 38 are also arranged to release air from the bladders 36 upon completion of the servicing operation so as to permit the bladders 34 to be deflated and the associated diffuser arrangement to return to its submerged position near the bottom of the basin. As in the first embodiment, a single valve 38 may be used to supply compressed air to both of the inflatable buoyant members 36 or to release air from them. The attachment of inflatable bladders to the downcomers is especially useful when the diffuser arrangement 18 consists of only a single diffuser element rather than a series of elements in side-by-side relation as shown in FIG. 2.

For the diffuser arrangement 18 at the right as seen in FIG. 1, each inflatable buoyant member is a canister 46 mounted at the lower end of each downcomer 20. Each canister 46 is arranged, for example with an opening in the bottom, to permit displacement of water within the canister in response to air applied under pressure to the interior of the canister by adjusting the valves 34. The maximum volume of the canisters is selected so that they have sufficient buoyancy to raise the diffuser arrangement 18 to the surface of the water.

In the embodiment as shown in FIG. 2, the diffuser arrangement 18 consists of several tubular diffuser elements in side-by-side relation. Alternatively, the diffuser arrangement 18 could consist of a single tubular diffuser element or it could be a flat panel diffuser of the type described in the Strunc et al. Patent No. 5,192,467, the disclosure of which is incorporated by reference herein. Moreover, the diffuser arrangements 18 need not be suspended above the bottom 14 of the basin but may instead rest on the bottom in a stationary condition. Furthermore, the air pressure supply line need not extend along the surface of the water if an appropriate valve control arrangement is provided at the shore of the basin.

Although the invention has been described herein with reference to specific embodiments, many modifications and variations therein will readily occur to those skilled in the art. Accordingly, all such variations and modifications are included within the intended scope of the invention.

I claim:

1. A submerged diffuser arrangement comprising:

a plurality of submerged air diffuser arrangements suspended from the surface of a body of water in a basin for diffusing air into the body of water;

an air supply pipe extending along the surface of the water and connected by downcomers to each of the submerged diffuser arrangements to supply air under pressure thereto;

inflatable buoyant means associated with each diffuser arrangement and capable, when inflated, of providing sufficient buoyancy to raise the diffuser arrangement to the surface of the water; and air pressure tube means connecting each inflatable buoyant means to a corresponding valve at the surface of the water above the corresponding diffuser arrangement and arranged to supply air under pressure to the inflatable buoyant means associated with the diffuser arrangement to inflate the inflatable buoyant means.

2. A submerged diffuser arrangement according to claim 1 wherein the inflatable buoyant means comprises a bladder.

3. A submerged diffuser arrangement according to claim 1 wherein the inflatable buoyant means comprises a canister from which water is displaced when the canister is supplied with air under pressure.

4. A submerged diffuser arrangement according to claim 1 wherein the valve is arranged to selectively connect the air pressure tube means to receive air from the air supply pipe.

5. A submerged diffuser arrangement according to claim 1 wherein the valve is arranged to connect the air pressure tube means to a portable compressed air supply.

6. A submerged diffuser arrangement according to claim 1 including:

an air pressure supply tube extending along the air supply pipe for supplying air under pressure to the air pressure tube means leading to the inflatable buoyant means associated with the diffuser arrangement; and wherein the valve at an end of the air pressure tube means at the surface of the water by which the air pressure tube means is connected to the air pressure supply tube permits air under pressure to be supplied through the air pressure tube means to the inflatable buoyant means or, alternatively, permits air in the inflatable buoyant means to be expelled and the associate diffuser arrangement inflatable buoyant to be submerged.

7. A submerged diffuser arrangement according to claim 1 wherein each diffuser arrangement includes a plurality of elongated diffuser devices arranged in side-by-side relation and the inflatable buoyant means extends across the adjacent ends of the diffuser devices.

8. A submerged diffuser arrangement according to claim 1 wherein the inflatable buoyant means is affixed to the end of a downcomer adjacent to the diffuser arrangement.

9. A submerged diffuser arrangement according to claim 1 including:

an air supply unit disposed adjacent to the basin for supplying air through the air supply pipe to the diffuser arrangements and also through an air pressure supply tube means to the air pressure tube means connected to each inflatable buoyant means.

10. A submerged diffuser arrangement according to claim 9 including:

the air compressor connected to an air pressure supply tube to supply air under pressure to the air pressure tube means for the inflatable buoyant means and a valve for connecting the air pressure supply tube alternatively to the air compressor or to the air supply unit.

* * * * *